United States Patent
Nagahashi et al.

(10) Patent No.: US 7,415,140 B2
(45) Date of Patent: Aug. 19, 2008

(54) METHOD OF CORRECTING DEVIATION OF DETECTION POSITION FOR HUMAN FACE, CORRECTION SYSTEM, AND CORRECTION PROGRAM

(75) Inventors: Toshinori Nagahashi, Tatsuno-machi (JP); Takashi Hyuga, Suwa (JP)

(73) Assignee: Seiko Epson Corporation (JP)

( * ) Notice: Subject to any disclaimer, the term of this patent is extended or adjusted under 35 U.S.C. 154(b) by 569 days.

(21) Appl. No.: 11/043,900

(22) Filed: Jan. 26, 2005

(65) Prior Publication Data

US 2005/0180612 A1 Aug. 18, 2005

(30) Foreign Application Priority Data

Jan. 27, 2004 (JP) .............................. 2004-018375

(51) Int. Cl.
*G06K 9/00* (2006.01)
(52) U.S. Cl. .......................... 382/118; 382/164; 348/77
(58) Field of Classification Search .................. 382/118
See application file for complete search history.

(56) References Cited

U.S. PATENT DOCUMENTS

| | | | | |
|---|---|---|---|---|
| 5,164,992 | A * | 11/1992 | Turk et al. .................. | 382/118 |
| 6,263,113 | B1 * | 7/2001 | Abdel-Mottaleb et al. .. | 382/237 |
| 6,633,655 | B1 * | 10/2003 | Hong et al. ................. | 382/118 |
| 6,804,391 | B1 * | 10/2004 | Blake et al. ................. | 382/159 |
| 7,120,279 | B2 * | 10/2006 | Chen et al. .................. | 382/118 |
| 7,123,754 | B2 * | 10/2006 | Matsuo et al. .............. | 382/118 |
| 7,142,697 | B2 * | 11/2006 | Huang et al. ................ | 382/118 |
| 7,162,076 | B2 * | 1/2007 | Liu .............................. | 382/159 |
| 7,218,759 | B1 * | 5/2007 | Ho et al. ..................... | 382/118 |
| 7,221,809 | B2 * | 5/2007 | Geng .......................... | 382/280 |
| 7,236,615 | B2 * | 6/2007 | Miller et al. ................ | 382/118 |
| 2002/0150291 | A1 * | 10/2002 | Naf et al. .................... | 382/162 |
| 2002/0191818 | A1 * | 12/2002 | Matsuo et al. .............. | 382/118 |
| 2003/0071908 | A1 * | 4/2003 | Sannoh et al. .............. | 348/345 |
| 2004/0105672 | A1 * | 6/2004 | Misumi et al. ............... | 396/2 |

(Continued)

FOREIGN PATENT DOCUMENTS

JP 09-171560 6/1997

(Continued)

OTHER PUBLICATIONS

Communication from Japanese Patent Office regarding counterpart application.

*Primary Examiner*—Samir A. Ahmed
*Assistant Examiner*—Aklilu k Woldemariam
(74) *Attorney, Agent, or Firm*—Harness, Dickey & Pierce, P.L.C.

(57) ABSTRACT

A method of correcting the deviation of a position at which a human face is detected using a face detection frame F. An image G within the detection frame F is divided left and right along the portion of the center axis C. The degree of similarity of mirror-symmetrical relationship between the image portions G-1 and G-2 obtained by the division is calculated. An amount of positional deviation d that maximizes the degree of similarity and its direction are found. The frame F is moved a distance corresponding to the amount of positional deviation d in the direction. Thus, the deviation of the detection position due to the detection frame F can be corrected by a quick and simple method.

10 Claims, 7 Drawing Sheets

U.S. PATENT DOCUMENTS

2004/0264744 A1* 12/2004 Zhang et al. ................ 382/118

FOREIGN PATENT DOCUMENTS

| JP | 09-198512 | 7/1997 |
| JP | 11-298712 | 10/1999 |
| JP | 2003-038487 | 2/2003 |
| JP | 2003-189296 | 7/2003 |
| JP | 2003-281539 | 10/2003 |

* cited by examiner

F I G. 1
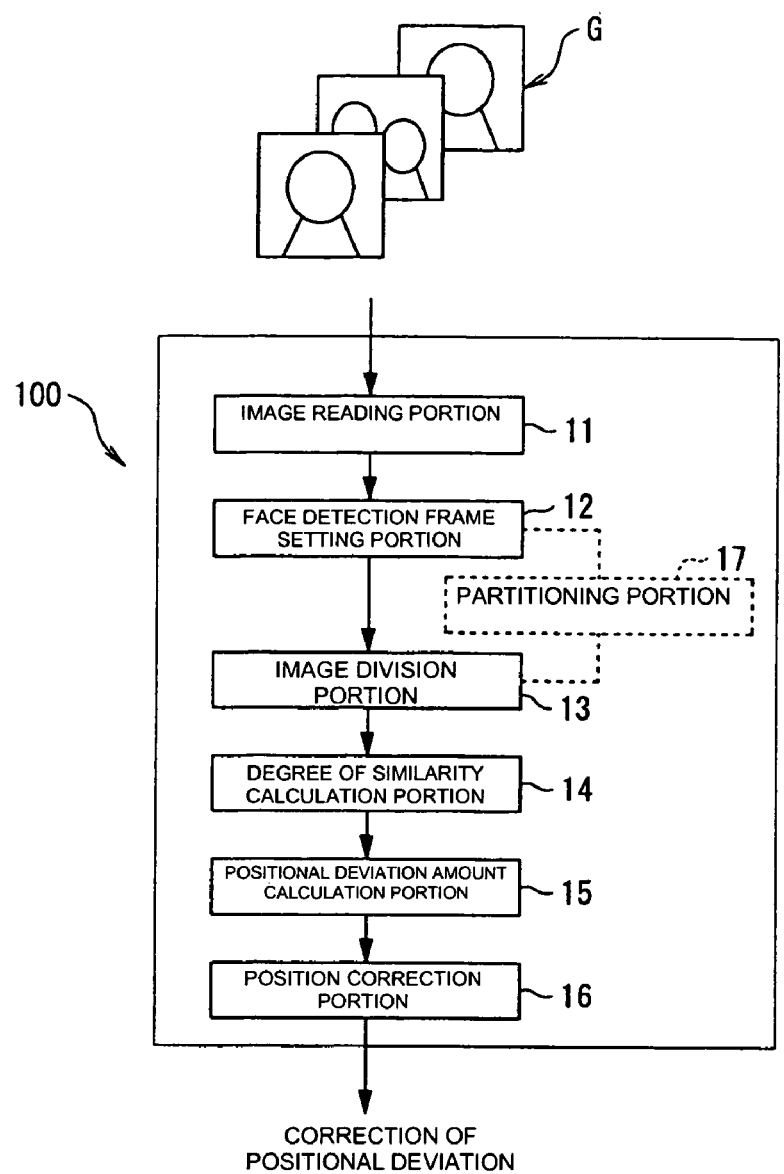

LATERAL EDGES

VERTICAL EDGES

METHOD OF CORRECTING DEVIATION OF DETECTION POSITION FOR HUMAN FACE, CORRECTION SYSTEM, AND CORRECTION PROGRAM

RELATED APPLICATIONS

This application claims priority to Japanese Patent Application No. 2004-018375 filed Jan. 27, 2004 which is hereby expressly incorporated by reference herein in its entirety.

BACKGROUND

1. Technical Field

The present invention relates to pattern recognition and object recognition techniques and, more particularly, to a human face detection position deviation-correcting method, correcting system, and correction program capable of detecting whether a detected human face has deviated in position and of correcting the position.

2. Related Art

In recent years, as pattern recognition technology and information-processing apparatuses such as computers have improved in performance, the accuracy at which characters and voice are recognized has improved at an amazing rate. It is known, however, that it is still difficult to recognize persons, objects, and scenes within images taken, for example, by a still image camera by pattern recognition technology, and that it is especially quite difficult to precisely and quickly recognize whether a human face is contained in such an image.

However, it has become quite important to recognize whether a human face is contained in such an image and to identify who is in the picture precisely and automatically using a computer in establishing biometric recognition technology, improving security, speeding up criminal investigations, increasing the rates at which image data are put in order, and speeding up search operations.

Meanwhile, in the case of ordinary users who are fond of photography and designers professionally engaging in image processing, they frequently want to make layouts about the subject human face from the taken digital photograph. In one case, for example, a picture where the face has been zoomed in is created from a picture containing the entire human body. In another case, a picture for a personal history is created.

In such cases, it is necessary to zoom into the face while precisely aligning the center of the face or to align the center of the face to the center of the photograph frame manually. Hence, complex and skilled operations are necessary.

Therefore, in the past, a method of detecting the position of a face using a facial image detection technique and aligning the position of the facial image has been proposed.

For example, in H. A. Rowley, S. Baluja, and T. Kanade, "Neural network-based face detection", IEEE Transactions on Pattern Analysis and Machine Intelligence, Vol. 20, No. 1, pp. 23-38, 1998, there is disclosed a technique for detecting a facial image by training a neural network using facial images.

Furthermore, in the above paper and so on, a decision is first made as to whether there is any region of human flesh color within an input image. A mosaic size is automatically determined about the region of human flesh color. A mosaic candidate region is created. The proximity to the dictionary of human faces is calculated. Thus, a decision is made as to whether there is a human face. The face is extracted. This reduces erroneous extraction due to the effects of the background. Consequently, human faces are found from images automatically and efficiently.

With the method of the above-cited paper, it is possible to detect a facial image but there is the problem that the center of the position of a human face can not always be precisely calculated as disclosed in the paper.

On the other hand, in JP-A-H9-171560, it is necessary to calculate the center line of the rotation while creating data about rotation of the face. Hence, there is the anxiety that the processing time is increased. Furthermore, it is assumed that every assumed pixel has symmetry. Therefore, it is quite difficult to stably gain the center line due to noise.

Accordingly, the present invention has been devised to effectively solve these problems. It is an object of the present invention to provide a novel human face detection position deviation-correcting method, correcting system, and correcting program capable of judging whether a detected human face has deviated from the detection position and of correcting the positional deviation from the detection position by a quick and simple method.

SUMMARY

To solve the foregoing problems, a method of correcting deviation of a detection position for a human face in accordance with aspect 1 is a method of correcting deviation of the detection position at which a human face is detected using a face detection frame. The method comprises the steps of: dividing an image within the face detection frame into left and right image portions about a central axis portion thereof; calculating a degree of similarity of mirror-symmetrical relationship between the two image portions; finding an amount of positional deviation at which the degree of similarity maximizes and direction of the positional deviation; and then moving the detection frame a distance in the direction, the distance corresponding to the amount of positional deviation.

Generally, in an evidence photograph such as for a driver's license or a souvenir photograph such as a graduation album, human faces in the photographs are mostly the faces of persons facing forward and standing upright or tilting slightly. The prior art facial image detection technology searches for facial images under these conditions. Where a person faces forward and is standing upright or tilting slightly in this way, the face is symmetrical left and right about a center axis extending from the space between the eyebrows toward the tip of the nose. The method of correcting deviation of the detection position in accordance with the invention makes use of this left-and-right symmetry of the face.

In particular, the method can be considered as follows. Where a human face detected using a face detection frame is precisely captured within the frame, the degree of similarity between the left and right image portions about the center axis of the frame within the detection frame is highest. As the detection position deviates more right or left, the position of the center axis also deviates more, and the degree of similarity between the left and right image portions within the detection frame decreases gradually.

Accordingly, the present invention first divides an image within the face detection frame into left and right portions about the center axis portion thereof. Then, the degree of similarity of mirror-symmetrical relationship between the two image portions is calculated. The amount of positional deviation that maximizes the degree of similarity and its direction are found. As a result, where the amount of deviation is zero, it can be judged that the first detection using the face detection frame has succeeded in precisely detecting a human face. Therefore, correction of the amount of deviation is not necessary. Where deviation of the detection position and the amount of deviation are found, the detection frame is then moved a distance corresponding to the amount of positional deviation in the direction of the deviation. Thus, a correction is made.

Thus, it is possible to precisely determine whether the detection position for a human face detected using the face detection frame has deviated or not. The deviation of the detection position can be corrected by a quick and simple method.

A method of correcting deviation of a detection position for a human face in accordance with aspect 2 is a method of correcting deviation of the detection position at which a human face is detected using a face detection frame. The method comprises the steps of: partitioning the inside of the face detection frame into vertical stages of bands; dividing an image within each of the bands inside the face detection frame into left and right image portions about a central axis portion thereof; calculating a degree of similarity of mirror-symmetrical relationship between the two image portions; finding an amount of positional deviation at which the degree of similarity maximizes and direction of the positional deviation; and then moving each of the bands a distance corresponding to the amount of positional deviation in the direction.

That is, the present invention partitions the inside of the frame detection frame into vertical stages of bands. The amount of positional deviation at which the degree of similarity between the two image portions maximizes and the directions are found for each of the bands.

In this way, the deviation of the detection position for the human face detected with the face detection frame and the amount of deviation can be found in the same way as in aspect 1. In addition, it is possible to precisely detect whether there is a tilt in the face within the face detection frame, depending on the presence or absence of positional deviation between the bands and on the amount of the positional deviation. Also, the amount of tilt can be detected. If the tilt in the human face is detected by the present invention, the tilt itself is not corrected. That is, there is no function of correcting the original picture. Also, the invention does not require it because of its nature.

A method of correcting deviation of a detection position for a human face in accordance with aspect 3 is based on a method of correcting deviation of the detection position for a human face as set forth in aspect 1 or 2 and further characterized in that the degree of similarity of mirror-symmetrical relationship between the two image portions obtained by the division is determined based on a correlation coefficient utilizing edge intensities of all pixels constituting the image within the face detection frame.

The degree of similarity of mirror-symmetrical relationship between the two image portions can be found more precisely by determining the degree of similarity of mirror-symmetrical relationship between the image portions based on the correlation coefficient utilizing edge intensities of all pixels constituting the image within the face detection frame in this way.

A method of correcting deviation of a detection position for a human face in accordance with aspect 4 is based on a method of correcting deviation of the detection position for a human face as set forth in any one of aspects 1 to 3 and further characterized in that where the number of pixels constituting the image within the face detection frame is odd in a left-and-right direction, the number of pixels in the left-and-right direction is adjusted to an even number by moving one or both of the left and right ends of the face detection frame in the left-and-right direction so as to stretch or contract the frame.

That is, the image within the frame detection frame is divided, left and right, into two portions along its center axis as mentioned previously. Therefore, if the number of pixels of the image captured in the face detection frame is odd in the left-and-right direction, it is impossible to divide the image into left and right portions uniformly. Accordingly, in this case, any one or both of the left and right ends of the detection frame is moved in the left-and-right direction so as to stretch or contract the frame, thus adjusting the number of pixels in the left-and-right direction to an even number. Consequently, the image captured with the face detection frame can be divided, left and right, into two portions of uniform area.

A method of correcting deviation of a detection position for a human face in accordance with aspect 5 is based on a method of correcting deviation of the detection position for a human face as set forth in any one of aspects 1 to 4 and further characterized in that the face detection frame is a rectangular form parallel to a center line of the human face.

The shape of the aforementioned face detection frame is not always required to be limited to a certain kind of fixed one. Various geometrical shapes such as circles and polygons can be used. If the rectangular form is parallel to the center line of the human face, it is easy to calculate the degree of similarity between the image portions obtained by the division. Consequently, processing for correcting the positional deviation can be performed more precisely and quickly.

A method of correcting deviation of a detection position for a human face in accordance with aspect 6 is based on a method of correcting deviation of the detection position for a human face as set forth in aspect 3 and further characterized in that average values of edge intensities of the pixels taken in the up-and-down direction are used as the first-mentioned edge intensities.

Thus, the effects of noise and contamination in the image can be reduced.

A method of correcting deviation of a detection position for a human face in accordance with aspect 7 is based on a method of correcting deviation of the detection position for a human face as set forth in any one of aspects 1 to 6 and further characterized in that the face detection frame is set automatically or manually using a face detection technique.

As mentioned previously, the face detection frame is set automatically using a face detection technique as described in the above-cited paper. Besides, the invention can cope with a case in which the user manually sets the frame using an input device such as a mouse while watching the image displayed on a PC monitor, for example.

A method of correcting deviation of a detection position for a human face in accordance with aspect 8 is based on a method of correcting deviation of the detection position for a human face as set forth in any one of aspects 3 and 6 and further characterized in that the edge intensities use a Sobel edge detection operator.

That is, the most typical method of detecting rapid variations in gray level within an image is to find a derivative of the gray level. Since a derivative of a digital image is replaced by a difference, edge portions across which the gray level within the image varies rapidly can be detected effectively by taking the first-order derivative of the image within the face detection frame.

In addition, the present invention uses a well-known Sobel edge detection operator as this first-order edge detection operator (filter), the Sobel edge detection operator being excellent in terms of detection performance. As a consequence, edge portions of the image within the face detection frame can be detected reliably.

A system for correcting deviation of a detection position for a human face in accordance with aspect 9 is a system for correcting deviation of the detection position for a human face detected using a face detection frame. The system comprises: an image reading portion for reading an image containing the human face; a face detection frame setting portion for setting the face detection frame in a portion of the human face within the image read by the image reading portion; an image division portion for dividing the image within the face detection frame detected by the face detection frame setting portions into left and right image portions about a central axis thereof; a degree of similarity calculation portion for calculating a degree of similarity between the left and right image portions obtained by the image division portion; a positional deviation amount calculation portion for calculating an amount of positional deviation at which the degree of similarity obtained by the similarity degree calculation portion maximizes and direction of the positional deviation; and a position correction portion for moving the face detection frame in the direction according to the amount of positional deviation calculated by the positional deviation amount calculation portion.

Thus, it is possible to precisely judge whether the detection position for the human face detected using the face detection frame has deviated or not, in the same way as in aspect 1. Also, the deviation of the detection position can be corrected by a quick and simple method.

These operations and effects can be automatically accomplished by realizing these portions by making use of dedicated circuits or a computer system.

A system for correcting deviation of a detection position for a human face in accordance with aspect 10 is a system for correcting deviation of the detection position for a human face detected using a face detection frame and comprises: an image reading portion for reading an image containing the human face; a face detection frame setting portion for setting the face detection frame in a portion of the human face within the image read by the image reading portion; a partitioning portion for partitioning the inside of the face detection frame detected by the face detection frame into vertical stages of bands; an image division portion for dividing the image within each of the bands formed by the partitioning portion into left and right image portions about a central axis thereof; a degree of similarity calculation portion for calculating a degree of similarity between the left and right image portions obtained by the image division portion; a positional deviation amount calculation portion for calculating an amount of positional deviation at which the degree of similarity calculated by the similarity degree calculation portion maximizes and direction of the positional deviation; and a position correction portion for moving each of the bands in the direction according to the amount of positional deviation calculated by the positional deviation amount calculation portion.

Thus, it is possible to precisely judge whether the detection position for the human face detected using the face detection frame has deviated and whether there is a tilt, in the same way as in aspect 2. Also, the deviation of detection position can be corrected by a quick and simple method. In addition, in the same way as in aspect 9, these operations and effects can be automatically accomplished by realizing these portions by making use of dedicated circuits or a computer system.

A system for correcting deviation of a detection position for a human face in accordance with aspect 11 is based on a system for correcting deviation of the detection position as set forth in aspect 9 or 10 and further characterized in that the degree of similarity calculation portion performs calculations based on a correlation coefficient about the mirror-symmetrical relationship between the left and right image portions by making use of the edge intensities of all the pixels within each of the image portions.

Thus, the degree of similarity between the two image portions obtained by the division can be found more precisely by determining the degree of similarity of mirror-symmetrical relationship between the two image portions based on the correlation coefficient utilizing the edge intensities of all pixels constituting the image within the face detection frame in the same way as in aspect 3.

A program for correcting deviation of a detection position for a human face in accordance with aspect 12 is a program for correcting deviation of the detection position at which a human face is detected using a face detection frame. The program causes a computer to perform functions of: an image reading portion for reading an image containing the human face; a face detection frame setting portion for setting the face detection frame in a portion of the human face within the image read by the image reading portion; an image division portion for dividing the image within the face detection frame detected by the face detection frame setting portion into left and right image portions about a central axis thereof; a degree of similarity calculation portion for calculating a degree of similarity between the two image portions obtained by the image division portion; a positional deviation amount calculation portion for calculating an amount of positional deviation at which the degree of similarity obtained by the degree of similarity calculation portion maximizes and direction of the positional deviation; and a position correction portion for moving the face detection frame in the direction according to the amount of positional deviation calculated by the positional deviation amount calculation portion.

Thus, the same advantages as aspect 1 are obtained. Since the functions can be realized in software using a general-purpose computer (hardware) such as a personal computer, the functions can be realized more economically and easily than where a dedicated apparatus is created and used. Furthermore, in many cases, modifications and version-up grades (such as improvements) can be easily attained simply by rewriting the program.

A program for correcting deviation of a detection position for a human face in accordance with aspect 13 is a program for correcting deviation of the detection position at which a human face is detected using a face detection frame. The program causes a computer to perform functions of: an image reading portion for reading an image containing the human face; a face detection frame setting portion for setting the face detection frame in a portion of the human face within the image read by the image reading portion; a partitioning portion for partitioning the inside of the face detection frame detected by the face detection frame setting portion into vertical stages of bands; an image division portion for dividing the image within each band formed by the partitioning portion into left and right image portions about a central axis thereof; a degree of similarity calculation portion for calculating a degree of similarity between the two image portions obtained by the image division portion; a positional deviation amount calculation portion for calculating an amount of positional deviation at which the degree of similarity calculated by the similarity degree calculation portion maximizes and direction of the positional deviation; and a position correction portion for moving each of the bands in the direction according to the amount of positional deviation calculated by the positional deviation amount calculation portion.

Thus, the same advantages as aspect 2 are obtained. Furthermore, the functions can be realized more economically and easily than where a dedicated apparatus is created and used in the same way as in aspect 12.

A program for correcting deviation of a detection position for a human face in accordance with aspect 14 is based on a program for correcting deviation of the detection position as set forth in aspect 12 or 13 and further characterized in that the correlation coefficient calculation portion calculates a correlation coefficient about the mirror-symmetrical relationship between the image portions based on the edge intensities of all the pixels within each of the image portions.

Thus, the same advantages as aspect 3 are obtained. Furthermore, the functions can be realized more economically and easily than where a dedicated apparatus is created and used, in the same way as in aspect 12.

BRIEF DESCRIPTION OF THE DRAWINGS

FIG. 1 is a block diagram showing one embodiment of a system for correcting deviation of a detection position for a human face;

FIGS. 9(*a*) and 9(*b*) are diagrams illustrating Sobel operators used to detect edge intensities.

DETAILED DESCRIPTION

Figure 2:
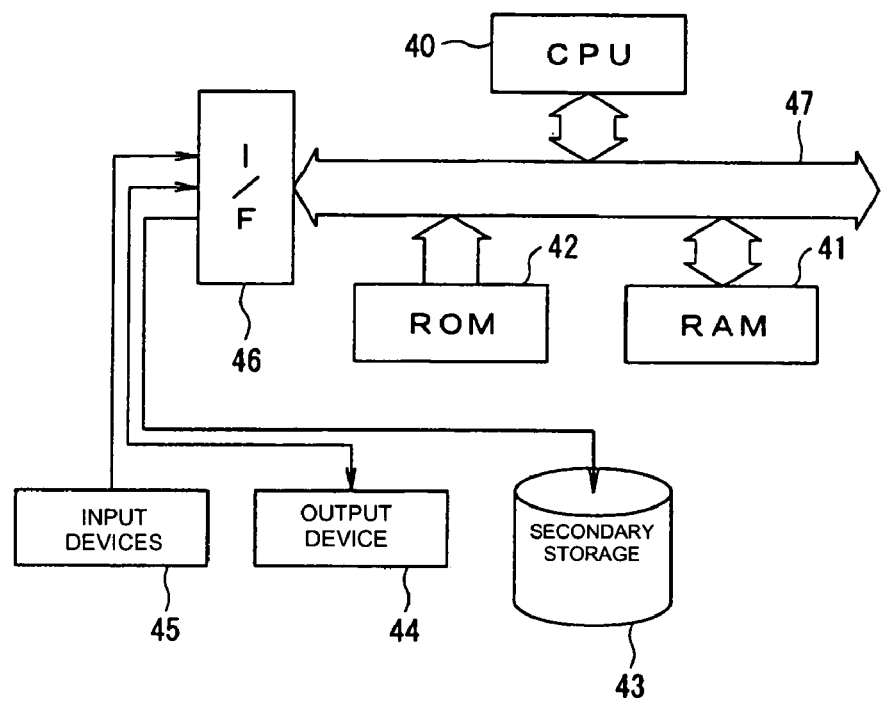
FIG. 2 is a schematic view showing hardware that can be used in the system of the present invention.

The best mode for carrying out the present invention is hereinafter described in detail with reference to the accompanying drawings.

FIG. 1 shows one embodiment of a system 100 for correcting deviation of a detection position for a human face, the system being associated with the present invention.

As shown, this system 100 for correcting deviation of the detection position consists principally of an image reading portion 11 for reading an image containing a human face, a face detection frame setting portion 12 for setting a face detection frame F in the portion of the human face in the image read by the image reading portion 11, an image division portion 13 for dividing the image G within the face detection frame F detected by the face detection frame setting portion 12, a degree of similarity calculation portion 14 for calculating the degree of similarity between the image portions obtained by the image division portion 13, a positional deviation amount calculation portion 15 for calculating an amount of positional deviation at which the degree of similarity obtained by the degree of similarity calculation portion 14 maximizes as well as the direction, and a positional correction portion 16 for moving the detection frame F a distance corresponding to the amount of positional deviation calculated by the positional deviation amount calculation portion 15 in the direction.

First, the image reading portion 11 provides a function of gaining the image G containing the face of at least one person facing forward as digital image data comprising image data sets about R (red), G (green), and B (blue) by making use of an image sensor such as a CCD (charge-coupled device) image sensor or CMOS (complementary metal oxide semiconductor) image sensor. Examples of the image G include an evidence photograph (such as for a passport or a driver's license), a souvenir photograph (such as a graduation album), and some snapshots.

In particular, the reading portion is a CCD camera or CMOS camera (such as a digital still camera or digital video camera), image scanner, vidicon camera, drum scanner, or the like. The reading portion converts the analog facial image G optically read into the image sensor into digital form and sends the digital image data to the face detection frame setting portion 12 in succession.

The image reading portion 11 is fitted with a function of storing data, and can appropriately store the facial image data read in onto a storage device such as a hard disk drive (HDD) or a storage medium such as a DVD-ROM. Where a facial image is supplied as digital image data via a network, storage medium, or the like, the image reading portion 11 is dispensed with or functions as a communications unit or interface (I/F).

Figure 5:
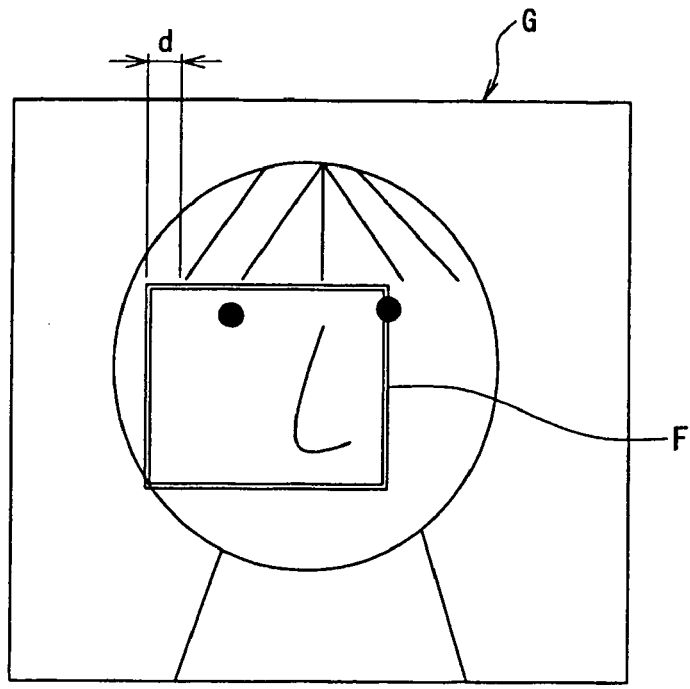
FIG. 5 is a conceptual diagram showing the state in which the position of an image of a face detected with a face detection frame has deviated.

One well-known face detection means using the face detection frame F for identifying a certain region is directly used as the face detection frame setting portion 12. For example, as shown in FIG. 5, the setting portion detects a human face from within the facial image G read by the image reading portion 11 and sets the rectangular face detection frame F in this portion.

No limitations are imposed on the algorithm of detecting a human face using the face detection frame setting portion 12. For example, a prior art technique as shown in the above-quoted paper can be used intact. According to the technique of the above-quoted paper, a facial image of a region including at least the eyes, nose, and lips of the human face is created. Using this image, a neural network is trained. Using the trained neutral network, the human face is detected. The size of the face detection frame F is not fixed but can be appropriately increased or reduced according to the size of the subject facial image.

Figure 7:
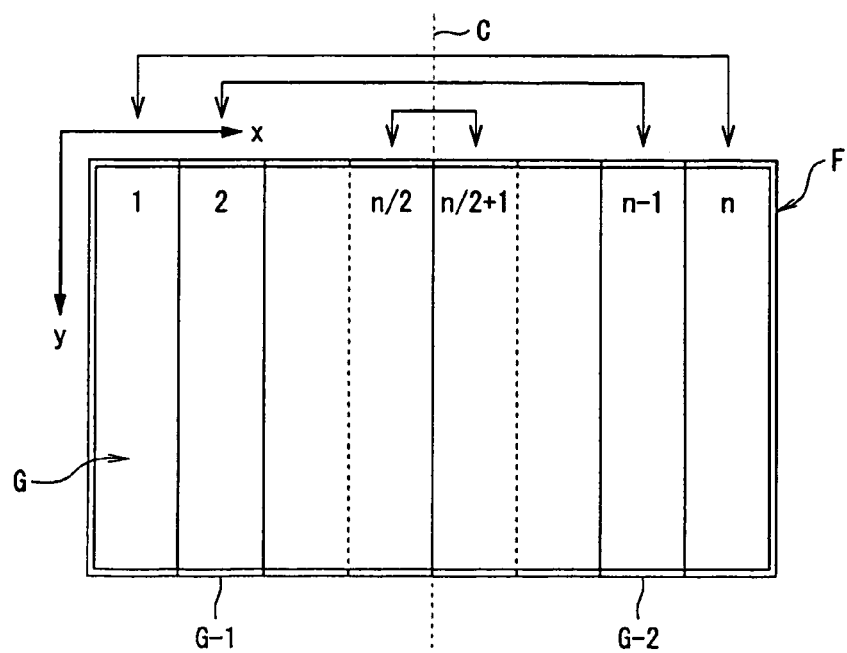
FIG. 7 is a conceptual diagram showing the state in which the face detection frame has been divided left and right along the center. axis.
Figures 8, 9A, 9B:
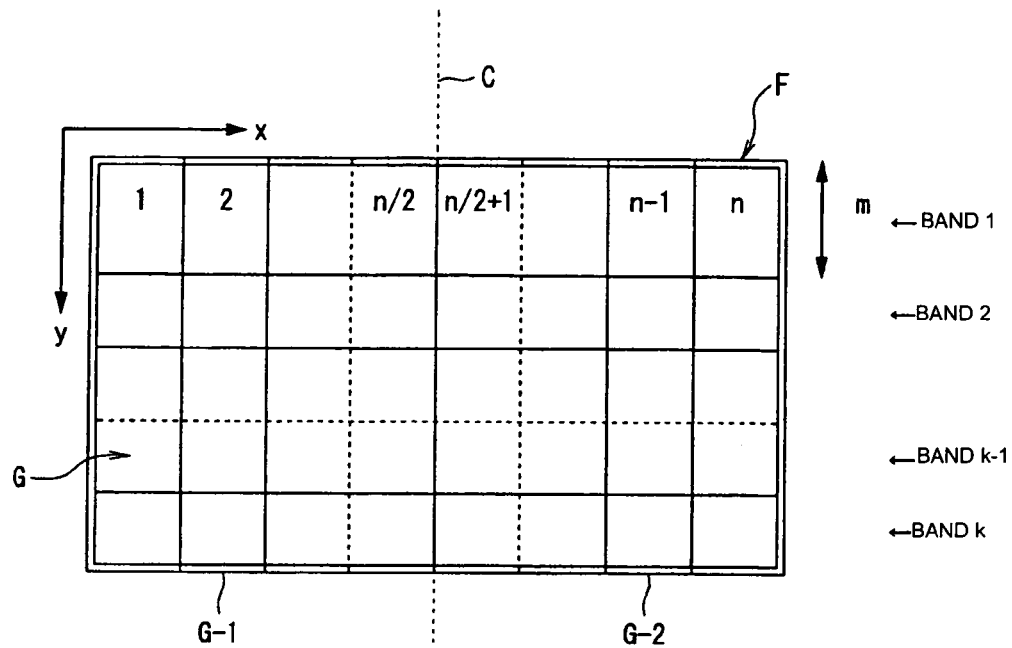
FIG. 8 is a conceptual diagram showing the state in which the face detection frame has been partitioned into vertical stages of bands.

The image division portion 13 provides a function of uniformly dividing the image G within the face detection frame F set by the face detection frame setting portion 12 into left and right, two image portions G-1 and G-2 about the center axis C as shown in FIGS. 7 and 8. As described in detail later, where the number of pixels of the image G within the detection frame F in the left-and-right direction (horizontal direction) is odd in dividing the image G within the detection frame F, the number of pixels is made odd by increasing or reducing the number of pixels in the face detection frame F by one at the right or left end. Then, the image is divided along the center axis.

The degree of similarity calculation portion 14 provides a function of calculating the degree of similarity between the left and right image portions G-1 and G-2 obtained by the image division portion 13. More specifically, the degree of similarity between the image portions G-1 and G-2 is calculated by calculating the edge intensities of the image portions G-1 and G-2 and a correlation coefficient based on the edge intensities as described in detail later. The degree of similarity is sent to the positional deviation amount calculation portion 15.

The positional deviation amount calculation portion 15 provides a function of calculating the amount of positional deviation at which the degree of similarity obtained by the degree of similarity calculation portion 14 maximizes and the direction. A specific example of the calculation portion will be described in detail later in the same way as the degree of similarity calculation portion 14.

The position correction portion 16 provides a function of moving the face detection frame F a distance in the direction, the distance corresponding to the amount of positional deviation calculated by the positional deviation amount calculation portion 15. Thus, the detection frame F can be corrected to a correct position.

Figure 3:
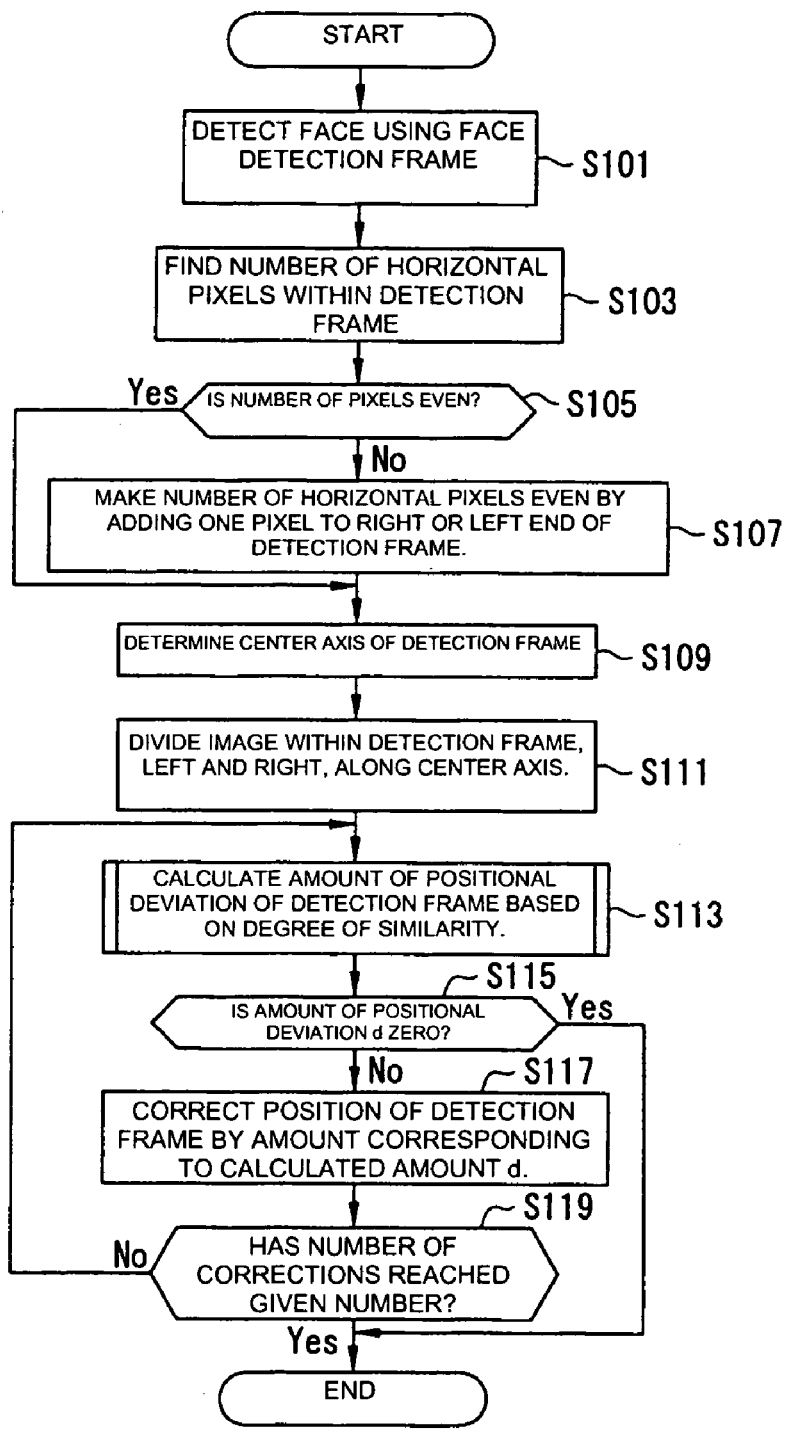
FIG. 3 is a flowchart showing one example of processing for correcting deviation of the detection position.

The portions 11-17 forming the detection positional deviation correction system 100 are actually realized by a computer system (such as a personal computer) comprising hardware including a CPU and a RAM as shown in FIG. 2 and a dedicated computer program (software) realizing the algorithm as shown in FIG. 3.

That is, the hardware for realizing the detection position deviation correction system 100 consists of, as shown in FIG. 2 a CPU (central processing unit) 40 that performs various control operations and arithmetic operations, the RAM (random access memory) 41 used in a main storage, a ROM (read-only memory) 42 that is a storage device for reading purposes only, a secondary storage 43 such as a hard disk drive or semiconductor memory, an output device 44 such as a monitor (e.g., an LCD (liquid-crystal display) or a CRT (cathode-ray tube)), input devices 45 comprising an image scanner, a keyboard, a mouse, and an image sensor (such as CCD (charge-coupled device) image sensor or CMOS (complementary metal oxide semiconductor) image sensor), input/output interfaces (I/F) 46 for the devices, and various internal and external buses 47 connecting the device to the input/output interfaces. The buses 47 include processor buses comprising PCI (peripheral component interconnect) or ISA (industrial standard architecture) buses, memory buses, system buses, and input/output buses.

Various programs for controlling purposes and data are installed into the secondary storage 43 or the like. The programs and data are supplied via a storage medium such as a CD-ROM, DVD-ROM, or flexible disk (FD) or via a communications network (such as LAN, WAN, or Internet) N. If necessary, the programs and data are loaded into the main storage 41. According to the programs loaded in the main storage 41, the CPU 40 makes full use of various resources to perform given control and arithmetic processing. The results of the processing (i.e., processed data) are output to the output device 44 via the buses 47 and displayed. If necessary, the data are appropriately stored in a database created by the secondary storage 43 or the database is updated.

One example of the method of correcting deviation of the detection position using the system 100 constructed in this way is described next with reference to FIGS. 3-9, the system 100 being used to correct deviation of the position at which a human face is detected.

FIG. 3 is a flowchart illustrating the flow of processing regarding correction of deviation of the detection position for a human face, the processing being according to the present invention.

First, if the subject image is read by the image reading portion 11, a face is detected using the face detection frame F from the subject facial image G by making use of a well-known face detection technique as shown in the above-quoted Paper as shown in step S101 by the face detection frame setting portion 12.

For example, if the face of a single person exists in the center of some image G as shown in FIG. 5, the rectangular face detection frame F is set on the human face and the face is detected. The size of the frame F is large enough to contain the eyes, nose, and lips.

Then, if the face detection frame F is set in this way, the program proceeds to the next step S103, where the image division portion 13 first finds the number of pixels within the detection frame F in the left-and-right direction (horizontal direction) and makes a decision as to whether the number of pixels is even or not (step S105).

If the result of the decision in this step S105 is that the number of pixels is even (Yes), the program jumps to step S109 without via the next step S107. If the result of the decision is that the number of pixels is not even (No), i.e., odd, the program goes to the next step S107. The right or left end of the detection frame F is shifted to stretch or contract the frame by one pixel to make the number of pixels within the detection frame F in the left-and-right direction even. For example, if the number of pixels within the first set detection frame F in the left-and-right direction is n, and if the n is even, the program jumps to step S109 without via step S107. If the n is odd, the right or left end of the detection frame F is shifted in the left-and-right direction to stretch or contract the frame by one pixel to set the number of pixels to n+1 or n−1.

In the step S109, the center axis C of the face detection frame F is determined based on the number of pixels. In the next step 111, the image G within the frame F is divided, left and right, along the center axis C to create two image portions. For example, as shown in FIGS. 7 and 8, in a case where the number of pixels within the detection frame F in the left-and-right direction (X-direction in the figure) is n (even, in this case), the center axis C is set between the positions of the numbers of pixels n/2 and n/2+1 as counted from the left or right end. The image G within the detection frame F is split into two, i.e., image portions G-1 and G-2, along the center axis C.

After the image G within the face detection frame F is divided, left and right, into two image portions G-1 and G-2 along the center axis C in this way, the program goes to the next step S113, where the positional deviation amount calculation portion 15 calculates the amount of positional deviation of the detection frame based on the degree of similarity calculated by the degree of similarity calculation portion 14, i.e., by making use of the degree of similarity.

Figure 4:
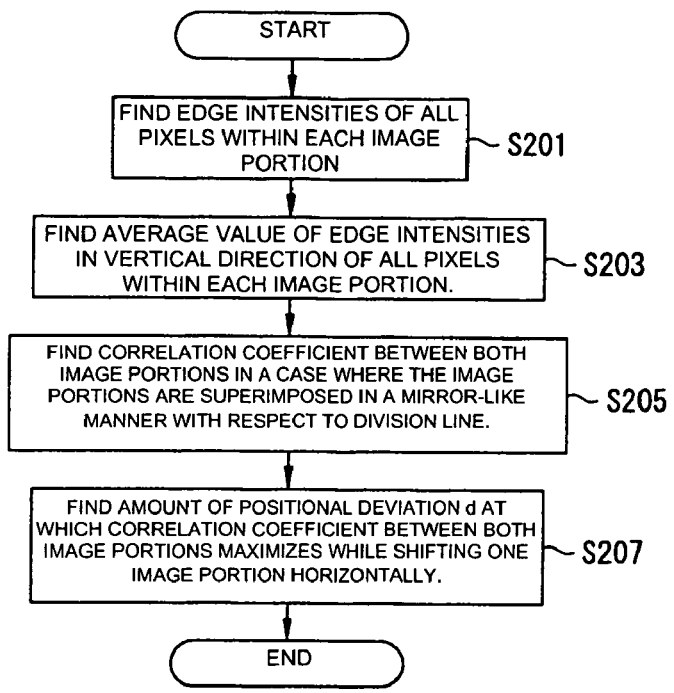
FIG. 4 is a flowchart showing one example of processing for calculating the amount of positional deviation based on a degree of similarity.

The flowchart shown in FIG. 4 particularly illustrates the flow of processing for calculating the amount of positional deviation in this step S113.

As shown, the degree of similarity calculation portion 14 finds the edge intensities of all the pixels within each of the image portions G-1 and G-2 in the first step S201.

Each edge intensity can be easily calculated, for example, by previously calculating the brightness (Y) of each pixel and using a well-known first-order derivative (differential type) edge detection operator typified by a Sobel edge detection operator and based on the brightness value.

In FIG. 9, (a) and (b) show Sobel edge detection operators. The operator (filter) shown in (a) of FIG. 9 enhances horizontal edges by adjusting the values of three pixels located on the left and right columns out of the values of 8 pixels surrounding a pixel of interest. The operator shown in (b) of FIG. 9 enhances the vertical edges by adjusting the values of three pixels located on the upper row and lower column out of the values of 8 pixels surrounding the pixel of interest. In this way, the vertical and horizontal edges are detected. The sum of the squares of the results produced by the operators is taken. The root square of the sum is taken. As a result, the edge intensity can be found.

As described previously, instead of the Sobel operators, other first-order derivative edge detection operators such as Roberts and Prewitt operators can be used.

The calculation of the edge intensities may be carried out at arbitrary timing before the image G within the face detection frame F is divided, i.e., between the steps S107 and S111.

After calculating the edge intensities of all the pixels in this way, the program proceeds to step S205 to calculate their degrees of similarity. Prior to this, the program goes to step S203, where the average value of the edge intensities of the pixels within each of the image portions G-1 and G-2 in the vertical direction is found to reduce the effects of noise and contamination in the image. For example, as shown in FIG. 7, in a case where the number of pixels of the image G within the detection frame F in the left-and-right direction is n, the sum of the edge intensities for each vertical pixel row (y-direction in the figure) is taken. The sum is divided by the number. Thus, the average value is computed. As a result, the number of obtained edge intensities is n, i.e., the same as the number of pixels in the image G within the frame F in the left-and-right direction.

In step S205, the degree of similarity is calculated using a correction coefficient obtained where the image portions G-1 and G-2 are superimposed on each other in a mirror-like manner about the division line (center axis) C. In the embodiment of FIG. 7, since the division is first performed between pixel n/2 and pixel "n/2+1", the row of pixel 1 and the row of pixel n correspond as shown. The row of pixel 2 and the row of pixel "n−1" correspond. The row of pixel n/2 and the row of "n/2 +1" correspond.

After calculating the first correlation coefficient in this way, the program goes to step S206, where an amount of positional deviation d at which the correlation coefficient between both image portions G-1 and G-2 maximizes is calculated based on the following Mathematical Formula 1 while shifting one image portion G-1 one or more pixel spacings at a time with respect to the other fixed image portion G-2 in the left-and-right direction.

$$\text{correlation coefficient} = \sum e(i) \times e(n-i+d)/EL/ER$$

$$\text{where } EL = \sqrt{\sum e(i) \times e(i)}$$

$$ER = \sqrt{\sum e(n-i+d) \times e(n-i+d)}$$

$$1 \le i \le n \text{ and } 1 \le n-i+d \le n$$

Mathematical Formula 1

Figure 6:
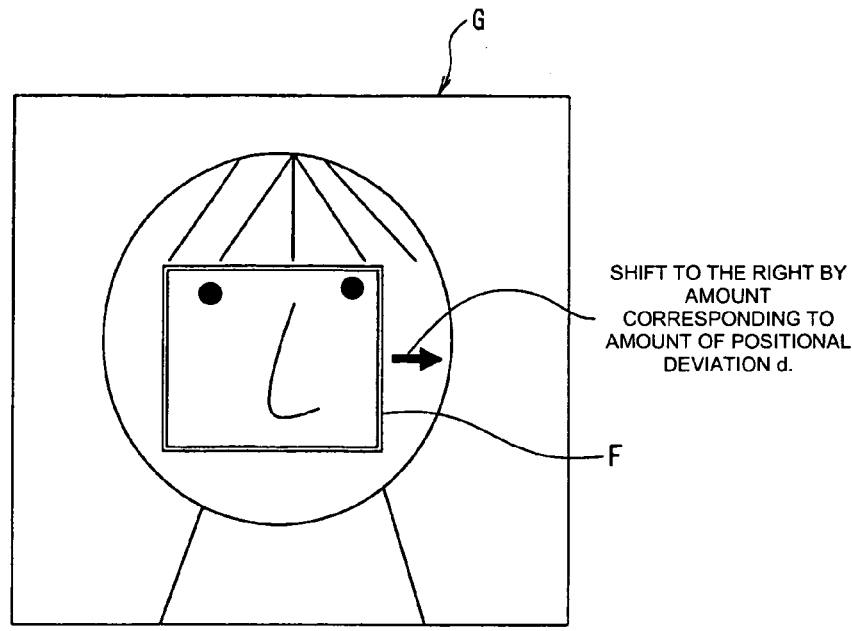
FIG. 6 is a conceptual diagram showing the state after the face detection frame has been corrected by an amount corresponding to the amount of deviation.

If the amount of positional deviation d which maximizes the degree of similarity is detected in step S113, the program goes to step S115 of FIG. 3. A decision is made as to whether the calculated amount of positional deviation d is zero or not. If the decision is affirmative (i.e., zero) (Yes), it is determined that the face detection frame F has precisely captured a human face, and then the processing is stopped. However, if the amount of positional deviation d calculated in step S115 is not zero (No), the program proceeds to the next step S117. The position of the face detection frame F is moved a distance corresponding to the amount of positional deviation d calculated by the position correction portion 12 in the direction of the deviation to correct it. In the embodiment of FIG. 5, the detection frame F has shifted to the left by the distance d and so the detection frame F is shifted to the right by the amount of positional deviation d to correct the position as shown in FIG. 6.

After the processing for correcting the position of the face detection frame F ends in this way, the number of the correcting processing steps is counted. The program goes to step 119, where a decision is made as to whether the number of corrections has reached a given number. If the decision is that the given number has been reached (Yes), the processing for correcting the position is stopped immediately. The position of the detection frame F at this time is established as the final detection position. If the decision is that the number of corrections has not reached the given number (No), the program returns to the entry side of the step S113, where detection of the amount of positional deviation d of the detection frame F that maximizes the degree of similarity and processing responsive to the amount of deviation are repeated until the given number is reached.

The number of corrections made to the face detection frame F differs according to processing capability of the hardware used for the processing such as a computer system, required detection accuracy, detection time, and so on. Therefore, no limitations are placed on the number. An appropriate number is about 10, for example, because no great improvement of the detection accuracy is observed if the correction is repeated further.

The positional deviation is found repetitively in this way for the following reason. In order to find the value of the positional deviation d in one operation, the value of d must be increased considerably. If the value is set large compared with the detected or specified region, the value of the correlation coefficient will become unstable. This makes it impossible to obtain a precise degree of similarity. Furthermore, if background is contained other than a facial image, it is difficult to find the precise value.

In this way, in the present invention, the image G within the face detection frame F is divided left and right along the portion of the center axis C. The degree of similarity of mirror-symmetrical relationship between the image portions G-1 and G-2 obtained by the division is calculated. The amount of positional deviation d at which the degree of similarity maximizes and its direction are found. Then, the detection frame F is moved a distance corresponding to the amount of positional deviation d to correct the position. In this way, deviation of the detection position due to the detection frame F can be corrected by a quick and simple method.

Another embodiment of the present invention is described next with reference to FIGS. 1, 8, and 10.

The present embodiment further has a partitioning portion 17 for partitioning the inside of the face detection frame F detected by the face detection frame setting portion 12 into vertical stages of bands B as shown in FIG. 1. Processing for correcting positional deviation similar to the above-described embodiment is performed for each of the bands B formed by the partitioning portion 17.

Figure 10:
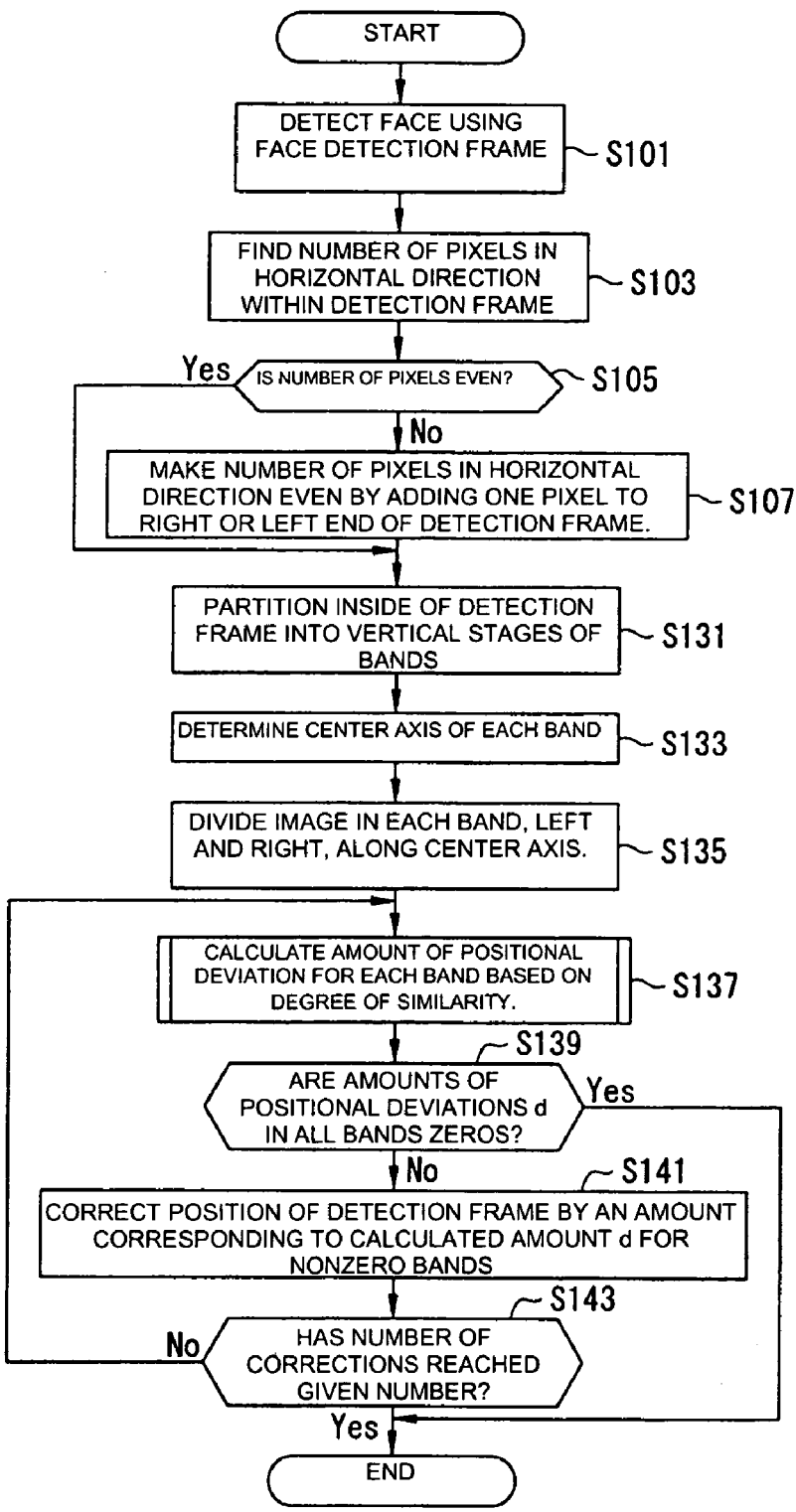
FIG. 10 is a flowchart illustrating another embodiment of the present invention.

Then, as illustrated in the flowchart of FIG. 10, the program passes through the face detection step (step S101 ), pixel number calculation step (step S103 ), pixel number decision step (step S105 ), and face detection frame enlargement/contraction step (step S107 ) in this order. Then, the program goes to step S131, where the image G inside the detection frame F is partitioned into vertical stages of bands B. For example, as shown in FIG. 8, before the image G captured in the detection frame F is divided about the center axis C, the image G is partitioned into vertical stages of bands 1 to k in the y-direction in the figure for each pixel number m in the vertical direction.

After partitioning the image G into the plural bands 1 to k in this way, the program goes to the next steps S133 and S135 in turn. The center axes C of the bands 1 to k, respectively, are determined. (At this time, all the center axes are aligned on a line.) The images in the bands 1 to k are each divided left and right along the center axis C.

After dividing the image in each of the bands 1 to k, left and right, along the center line C in this way, the program goes to the next step S137, where the amount of positional deviation d for each of the bands 1 to k is calculated by making use of the degree of similarity based on the correlation coefficient in the same way as in the step S113 of each of the above-described embodiments.

Where the image G within the face detection frame F is partitioned into the plural bands 1 to k in this way, the correlation coefficient is calculated as given by the following Mathematical Formulas 2 and 3.

$$\text{correlation coefficient} = \sum e_h(i) \times e_h(n-i+d_h)/EL_h/ER_h \quad \text{Mathematical Formula 2}$$

$$d = \sum_{h=1}^{k} dh/k \quad \text{Mathematical Formula 3}$$

That is, this is fundamentally the same as Mathematical Formula 1 described above. After finding the average value of edge intensities for each pixel number m in the y-axis direction, dh at which the correction coefficient maximizes is found based on Mathematical Formula 2 for each of the bands 1 to k. The average of the dh is taken as the amount of positional deviation d (Mathematical Formula 3).

After calculating the amount of positional deviation d for each band in this way, the program goes to the next step S139, where a decision is made as to whether the amounts of positional deviation d for all the bands are zeros. If the decision is that the amounts of positional deviation d for all the bands are zeros (Yes), the processing is stopped immediately. If the decision is that the amount of positional deviation d for any one band is nonzero (No), the program proceeds to the next step S141, where the position is corrected by an amount corresponding to the calculated amount of deviation d for the band for which the amount of positional deviation d has been found to be nonzero.

Then, if positional corrections for all the bands for which the amount of positional deviation d is nonzero are finished, the program goes to the next step S143, where a decision is made as to whether the number of corrections has reached a given number, in the same way as the foregoing embodiment. If the given number has been reached (Yes), the processing is stopped immediately. If the given number has not been reached (No), the program returns to the step S137, where the same processing is repeated until the given number is reached.

As a result, a mode in which the bands are shifted right or left and arrayed is conceivable, as well as a second mode in which all the bands are aligned vertically without staggering. In the case of the second mode, it can be judged that a human face stands upright. In the case of the first-mentioned mode, it can be judged that the human face tilts right or left.

In this way, in the case of the present embodiment, the image G within the face detection frame F is partitioned into vertical stages of bands, and the processing for correcting positional deviation is performed for each band. Therefore, the positional deviation within the face detection frame F can be corrected. In addition, the presence or absence of tilt can be detected. Also, the angle and direction of the tilt can be detected at the same time.

In the case of the above-described embodiment, such processing for each band is not performed. Correspondingly, there is the great advantage that the processing for correcting the position can, of course, be performed more quickly than the present embodiment. Furthermore, with respect to the correlation coefficient, the following Mathematical Formula 4 may be used instead of the Mathematical Formula 1. Instead of the Mathematical Formula 2, the following Mathematical Formula 5 may be used.

$$\text{correlation coefficient} = \sum_{i=0}^{i=ie} e(n/2+d-i) \times e(n/2+1+d+i) / \sqrt{EL} / \sqrt{ER} \quad \text{where} \quad \text{Mathematical Formula 4}$$

$$EL = \sum_{i=0}^{i=ie} e(n/2+d-i) \times e(n/2+d-i)$$

$$ER = \sum_{i=0}^{i=ie} e(n/2+1+d-i) \times e(n/2+1+d+i)$$

$$ie = n/2 - 1 - |d|$$

$$\text{correlation coefficient} = \sum_{i=0}^{i=ie} e_h(n/2+d-i) \times e_h(n/2+1+d+i) / \sqrt{EL_h} / \sqrt{ER_h} \quad \text{Mathematical Formula 5}$$

The "given number" referred to in the present embodiment differs according to the processing capability of the hardware used for the processing such as a computer system, required detection accuracy, detection time, and so on in the same way as in the above-described embodiments. Therefore, no limitations are placed on the given number. Furthermore, as the number of bands formed by the partitioning increases, more accurate detection can be expected. However, the amount of calculation is increased accordingly. Hence, similarly, no limitations are placed on the number.

In addition, in the above embodiments, the flow of processing is varied based on whether the amount of positional deviation d is zero or not. Since some amount of error is unavoidably produced, if amounts of positional deviation d within some range (less than some numerical value) are regarded as zero and the processing is stopped, the processing can be carried out more quickly instead of immediately ending the processing for correcting positional deviation only when the amount of positional deviation d is completely zero.

What is claimed is:

1. A method of correcting deviation of a detection position for a human face detected using a face detection frame, said method comprising the steps of:

dividing an image within said face detection frame into left and right image portions about a central axis portion thereof, the image within said face detection frame having an odd number of pixels in a left-and-right direction;

adjusting the number of pixels in the left-and-right direction of the image within said face detection frame to an even number by moving at least one of left and right ends of the face detection frame in a left or right direction so as to stretch or contract the face detection frame;

calculating a degree of similarity of mirror-symmetrical relationship between the two image portions based on a correction coefficient obtained based on a value of a pixel from the left image portion and a value of a corresponding pixel from the right image portion;

finding an amount of positional deviation at which the calculated degree of similarity maximizes and a direction of the positional deviation; and thereafter moving said face detection frame in said direction according to the amount of positional deviation.

2. A method of correcting deviation of a detection position for a human face as set forth in claim 1, wherein the degree of similarity of mirror-symmetrical relationship between said image portions obtained by the division is determined based on the correlation coefficient utilizing edge intensities of all pixels constituting the image within said face detection frame.

3. A method of correcting deviation of a detection position for a human face as set forth in claim 1, wherein said face detection frame is a rectangular form parallel to a center line of said human face.

4. A method of correcting deviation of a detection position for a human face as set forth in claim 2, wherein average values of edge intensities of the pixels taken in an up-and-down direction are used as the edge intensities.

5. A method of correcting deviation of a detection position for a human face as set forth in claim 1, wherein said face detection frame is set using a face detection technique.

6. A method of correcting deviation of a detection position for a human face as set forth in claim 2, wherein said edge intensities use a Sobel edge detection operator.

7. A system for correcting deviation of a detection position for a human face detected using a face detection frame, said system comprising:

an image reading portion for reading an image containing the human face;

a face detection frame setting portion for setting the face detection frame in a portion of the human face within the image read by said image reading portion;

an image division portion for dividing the image within the face detection frame detected by said face detection frame setting portion into left and right image portions about a central axis thereof, the image within the face detection frame having an odd number of pixels in a left-and-right direction, the image division portion adjusting the number of pixels in the left-and-right direction of the image within the face detection frame to an even number by moving at least one of left and right ends of the face detection frame in a left or right direction so as to stretch or contract the face detection frame;

a degree of similarity calculation portion for calculating a degree of similarity between the left and right image portions obtained by said image division portion based on a correction coefficient obtained based on a value of a pixel from the left image portion and a value of a corresponding pixel from the right image portion;

a positional deviation amount calculation portion for calculating an amount of positional deviation at which the degree of similarity obtained by said degree of similarity calculation portion maximizes and a direction of the positional deviation; and a position correction portion for moving said face detection frame a distance in said direction, the distance corresponding to the amount of positional deviation calculated by said positional deviation amount calculation portion.

8. A system for correcting deviation of a detection position as set forth in claim 7, wherein said degree of similarity calculation portion calculates the correlation coefficient about mirror-symmetrical relationship between said left and right image portions based on edge intensities of all pixels within each of the image portions.

9. A computer readable medium storing a program for correcting deviation of a detection position for a human face detected using a face detection frame, said program acting to cause a computer to perform functions of the system of claim 7.

10. The computer readable medium storing a program for correcting deviation of a detection position as set forth in claim 9, wherein said degree of similarity calculation portion calculates the degree of similarity according to the correlation coefficient about mirror-symmetrical relationship between said left and right image portions by making use of edge intensities of all pixels within each of said image portions.

* * * * *